(12) United States Patent
Buyuksahin (10) Patent No.: US 10,359,329 B2
(45) Date of Patent: Jul. 23, 2019

(54) SENSING SYSTEM WITH DIFFERENT UPPER LAYERS

(71) Applicant: SENSOBRIGHT INDUSTRIES, LLC, Dover City, Kent County, DE (US)

(72) Inventor: Utku Buyuksahin, Kadikoy/Istanbul (TR)

(73) Assignee: Sensobright Industries, LLC, Dover City, Kent County, DE (US)

( * ) Notice: Subject to any disclaimer, the term of this patent is extended or adjusted under 35 U.S.C. 154(b) by 0 days.

(21) Appl. No.: 16/085,888

(22) PCT Filed: Apr. 27, 2017

(86) PCT No.: PCT/TR2017/050168
§ 371 (c)(1),
(2) Date: Sep. 17, 2018

(87) PCT Pub. No.: WO2017/196281
PCT Pub. Date: Nov. 16, 2017

(65) Prior Publication Data
US 2019/0101465 A1  Apr. 4, 2019

(30) Foreign Application Priority Data
May 13, 2016  (TR) .............................. a 2016 06370

(51) Int. Cl.
*G01L 1/24* (2006.01)
*G01L 5/22* (2006.01)

(52) U.S. Cl.
CPC .............. *G01L 5/228* (2013.01); *G01L 1/242* (2013.01); *G01L 1/248* (2013.01)

(58) Field of Classification Search
CPC .......... G01L 5/228; G01L 1/242; G01L 1/248
See application file for complete search history.

(56) References Cited

U.S. PATENT DOCUMENTS

| | | |
|---|---|---|
| 4,547,668 A | 10/1985 | Tsikos |
| 4,816,811 A | 3/1989 | Bogatin et al. |
| (Continued) | | |

FOREIGN PATENT DOCUMENTS

| | | |
|---|---|---|
| WO | 2005029028 A1 | 3/2005 |
| WO | 2014011126 A1 | 1/2014 |

OTHER PUBLICATIONS

International Search Report and Written Opinion for corresponding PCT application No. PCT/TR2017/050168, dated Jan. 25, 2018.
(Continued)

*Primary Examiner* — Jonathan M Dunlap
(74) *Attorney, Agent, or Firm* — Notaro, Michalos & Zaccaria P.C.

(57) ABSTRACT

A structure which detects the application point, intensity and area of the force and the pressure applied, along with the touch, and the forces applied in vertical direction to the sensor as well as the combined forces, which has reduced power consumption. The sensing system has an intermediate layer; a light source located under the intermediate layer; an image sensor located under the intermediate layer; a first fiber optic bundle; a second fiber optic bundle; a control unit which analyzes the image captured by the image sensor using image processing techniques; and a data link for data communication between the image sensor and the control unit.

10 Claims, 5 Drawing Sheets

(56) References Cited

U.S. PATENT DOCUMENTS

| | | | | |
|---|---|---|---|---|
| 8,917,436 B2* | 12/2014 | Hollman | ............... | G02F 1/178 |
| | | | | 359/245 |
| 9,030,653 B1* | 5/2015 | Buyuksahin | ............ | G01L 5/228 |
| | | | | 356/32 |
| 9,170,419 B2* | 10/2015 | Charlson | .............. | G02B 26/004 |
| 9,897,496 B2* | 2/2018 | Hayashi | ................. | C08G 61/00 |
| 2010/0155579 A1 | 6/2010 | Torres-Jara | | |
| 2012/0229881 A1* | 9/2012 | Hollman | ................. | G02F 1/178 |
| | | | | 359/245 |
| 2012/0303839 A1 | 11/2012 | Jackson et al. | | |
| 2013/0017948 A1* | 1/2013 | Charlson | .............. | G02B 26/004 |
| | | | | 503/201 |
| 2015/0109607 A1 | 4/2015 | Buyuksahin | | |
| 2015/0130734 A1* | 5/2015 | Chang | .................... | G06F 3/044 |
| | | | | 345/173 |
| 2015/0217781 A1 | 8/2015 | Lee et al. | | |

OTHER PUBLICATIONS

International Preliminary Report on Patentability for corresponding PCT application No. PCT/TR2017/050168, dated Jun. 7, 2018.

\* cited by examiner

SENSING SYSTEM WITH DIFFERENT UPPER LAYERS

RELEVANT TECHNICAL FIELD

The present invention relates to sensing systems that are used especially in robotic systems.

BACKGROUND ART

In order to explore those areas which may be dangerous for human (for example, different planets, underground tunnels or caves), exploration robots are used. Exploration robots comprise various sensors for detecting objects in the area they are sent and for identifying the characteristics of the said objects. One of the sensors used in the said exploration robots is tactile sensors. By means of the tactile sensors, presence of certain objects and some physical features thereof such as pressure can be detected.

The conventional tactile sensors comprise a light source positioned under an elastic surface and a light sensing element for sensing the amount of the light reflected from the said surface, as disclosed in US2010155579A1. In such tactile sensors, when a force is applied on the elastic surface, the said surface approaches to the light source and the light sensing element. As a result of such approach, the amount of light incident on the light sensing element increases. The amount of light sensed by the light sensing element and resilience properties of the surface are used to calculate the amount of force applied to the surface. However, in this embodiment, the number of light sources that may be positioned under the unit surface and of the light sensing elements are limited, and it is cumbersome to process data received from a high number of light sensing elements.

Said problems are solved by a module disclosed in WO2014011126A1. The said module comprises an elastic material, which is covered with a layer providing light reflection; a CMOS or CCD image sensor; at least one light source; a plurality of first fiber optic cables, a tips of which are separated from surrounding environment via said layer by being located under the layer and other tips of which are in connection with said light source, wherein said first fiber optic cables carry light beams from the light source to said layer; a plurality of second fiber optic cables, a tips of which are separated from surrounding environment via said layer by being located under the layer and being directed towards the layer and other tips of which are in connection with said image sensor so that each second fiber optic cable is paired with one pixel of the image sensor, wherein light beams reflected from the layer are transferred to the image sensor by said second fiber optic cables; a processor which calculates every individual force applied to the layer according to light intensity changes of each pixel connected with a second fiber cable, of a photo frame generated by the image sensor in response to the displacement of the layer by using image processing techniques. In the module disclosed in WO2014011126A1, when the elastic material contacts to an object, a deformation is generated in the elastic material and the said layer (e.g. displacement of the layer towards the fiber optic cables). As a result of such displacement, the amount of light reflected from the layer to the fiber optic cable is changed. Said change in the amount of light is detected as a color change in the photo frame generated in the image sensor. The processor applies image processing techniques to the said photo frame so as to measure color changes of the photo, and thus the amount of displacement of the layer. Based on the amount of displacement calculated, the force applied on the elastic material is also calculated. However, due to the fact that in the said embodiment detection is only performed based on the level of light, an improvement is needed.

Another patent document U.S. Pat. No. 4,547,668A discloses a two-dimensional pressure sensor. Said pressure sensor comprises a light source; a matrix of light transmitting fiber endings comprising a plurality of fibers for transmitting said light from said light source and a plurality of fibers for receiving reflected light; a transmitting fiber sub-array comprising endings of said transmitting fibers located a distance from said matrix of light transmitting fiber endings, said endings located to receive light from said light source; a receiving fiber sub-array, comprising endings of said receiving fibers located a distance from said matrix of light transmitting fiber endings; a retro-reflective material located a distance above said matrix; a semi-transparent deformable medium located between said matrix and said retro-reflective material, said semi-transparent deformable medium supporting said retro-reflective material; a flexible membrane located adjacent said retro-reflective material side farthest from said matrix; and means located adjacent said receiving fiber sub-array, for detecting said reflected light transmitted by said light fibers from said matrix to said receiving fiber sub-array.

Another patent document WO2005029028A1 discloses an optical tactile sensor. Said optical tactile sensor comprises a sensing part comprising a transparent elastic body and a plurality of marker groups provided in said body, each marker group being comprised of a number of colored markers, with markers constituting different marker groups having different colors for each group, said elastic body having an arbitrary curved surface; a photographing device for taking an image of behavior of colored markers when said curved surface of elastic body is contacted by an object to obtain image information of markers, and a force vector distribution reconstructing device including a transfer function by which a force vector applied to the surface is reconstructed from information as to the behavior of markers that is obtained from the image information of markers, and said force vector distribution reconstructing device reconstructing forces applied to said surface from said information as to the behavior of markers by using the transfer function.

BRIEF DESCRIPTION OF THE INVENTION

The sensing system according to the present invention which detects touch comprises at least an intermediate layer; at least a upper layer located on the intermediate layer; at least one light source located under the intermediate layer; at least one image sensor located under the intermediate layer; at least a first fiber optic bundle comprising a plurality of fiber optic cables positioned such that a tips of which is facing to the light source and other tips of which is facing to the said intermediate layer, and transmitting the light obtained from the light source to the upper layer located on the intermediate layer; at least a second fiber optic bundle comprising a plurality of fiber optic cables, a tips of which is paired with at least one pixel of the image sensor and other tips of which is positioned facing to the intermediate layer, and transmitting the image of the upper layer located on the intermediate layer to the image sensor; at least one control unit which analyzes the image captured by the image sensor using image processing techniques so as to calculate a force applied on the intermediate layer; and at least a data link for data communication between the image sensor and the control unit.

In the sensing system according to the present invention, the light beams received from the light source pass through the intermediate layer onto the upper layer via the first fiber optic bundle. An image of the upper layer is transmitted to the image sensor via the second fiber optic bundle. Here, when a force is applied through the upper layer onto the intermediate layer, an image frame of a form (pattern) change, a color change or a brightness change of the upper layer captured by the image sensor is analyzed by the control unit using image processing techniques so that the force applied through the upper layer onto the intermediate layer may be calculated.

OBJECT OF THE INVENTION

An object of the present invention is to provide a sensing system suitable for use in robotic systems.

Another object of the present invention is to provide a sensing system capable of sensing touch.

Another object of the present invention is to provide a sensing system with reduced power consumption.

Another object of the present invention is to provide a sensing system wherein it is detected whether it is subjected to a certain force.

Another object of the present invention is to provide a sensing system wherein application point and area of the force applied is detected.

Another object of the present invention is to provide a sensing system wherein the pressure applied is detected.

Yet another object of the present invention is to provide a sensing system capable of detecting the forces applied in vertical direction to the sensor as well as the combined forces.

DESCRIPTION OF THE DRAWINGS

Illustrative embodiments of the sensing system according to the present invention are illustrated in the enclosed drawings, in which.

All the parts illustrated in the drawings are individually assigned a reference numeral and the corresponding terms of these numbers are listed as follows:
Sensing system (S)
Intermediate layer (1)
Light source (2)
Image sensor (3)
Upper layer (4)
First fiber optic bundle (5a)
Second fiber optic bundle (5b)
Data link (6)
Pattern (7)
Outer layer (8)
Elastic element (9)
Obstacle (10)
Distance element (11)

DESCRIPTION OF THE INVENTION

With the advanced robot technology, senses such as seeing, hearing, touching can be detected by sensor systems. Particularly, in exploration robots used to explore those areas that are dangerous for humans or not possible for humankind to arrive, the characteristics of the areas that are being explored can be detected accurately by means of the said sensor systems. Therefore, with the present invention, there is provided a sensing system capable of sensing touch.

The sensing system (S) according to the present invention, as illustrated in FIGS. 1-6, comprises at least an intermediate layer (1); at least a upper layer (4) located on the intermediate layer (1); at least one light source (2) located under the intermediate layer (1) (distant to the upper layer (4)); at least one image sensor (3) (i.e. a CCD, CMOS sensor etc.) located under the intermediate layer (1) (distant to the upper layer (4)); at least a first fiber optic bundle (5a) comprising a plurality of fiber optic cables positioned such that a tips of which is facing to the light source (2) and other tips of which is facing to the said intermediate layer (1), and transmitting the light obtained from the light source (2) to the upper layer (4) located on the intermediate layer (1); at least a second fiber optic bundle (5b) comprising a plurality of fiber optic cables, a tips of which is paired with at least one pixel of the image sensor (3) and other tips of which is positioned facing to the said intermediate layer (1), and transmitting the image of the upper layer (4) located on the intermediate layer (1) to the image sensor (3); at least one control unit (not shown) which analyzes the image captured by the image sensor (3) using image processing techniques so as to calculate a force applied on the intermediate layer (1); and at least a data link (6) for data communication between the image sensor (3) and the control unit. Said data link (6) may be a wired connection or a wireless connection.

Figure 1:
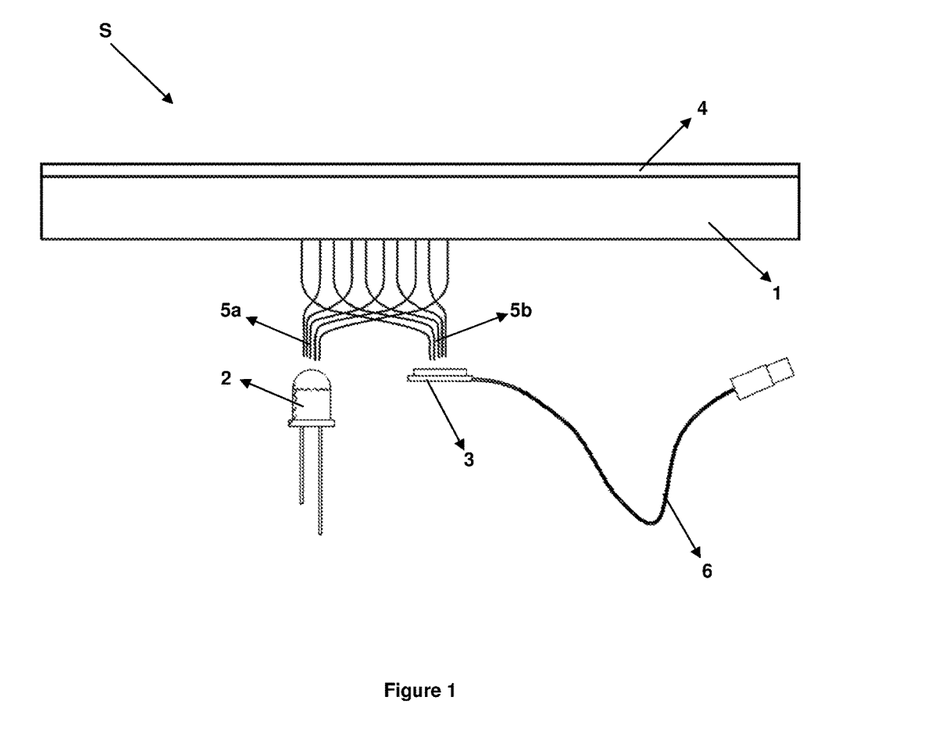
FIG. 1 is a side view of the sensing system.
Figure 2:
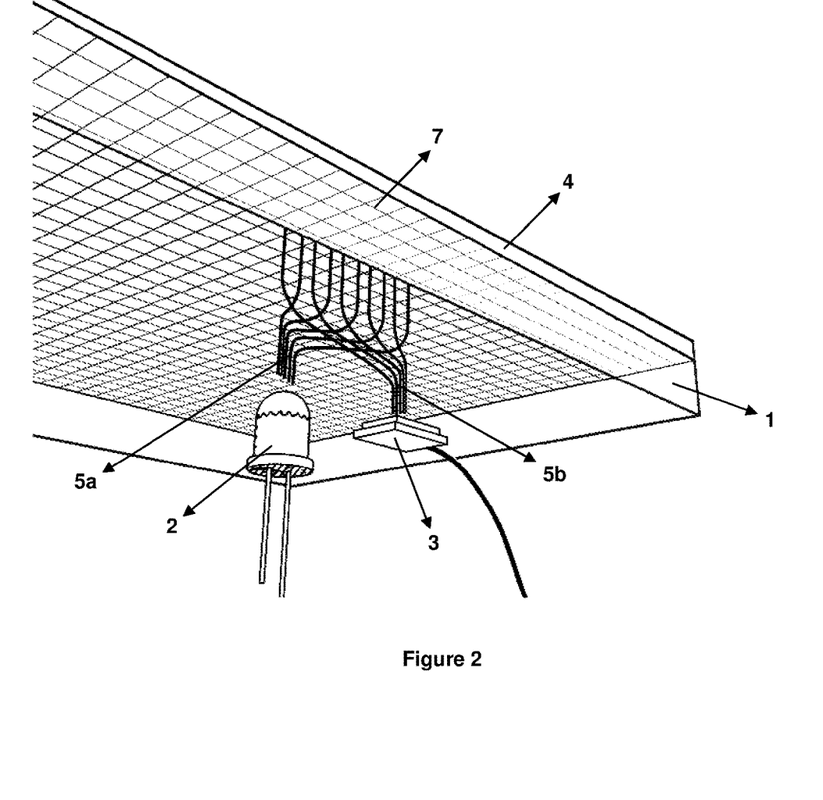
FIG. 2 is a perspective view of an exemplary embodiment of the sensing system.
Figure 3:
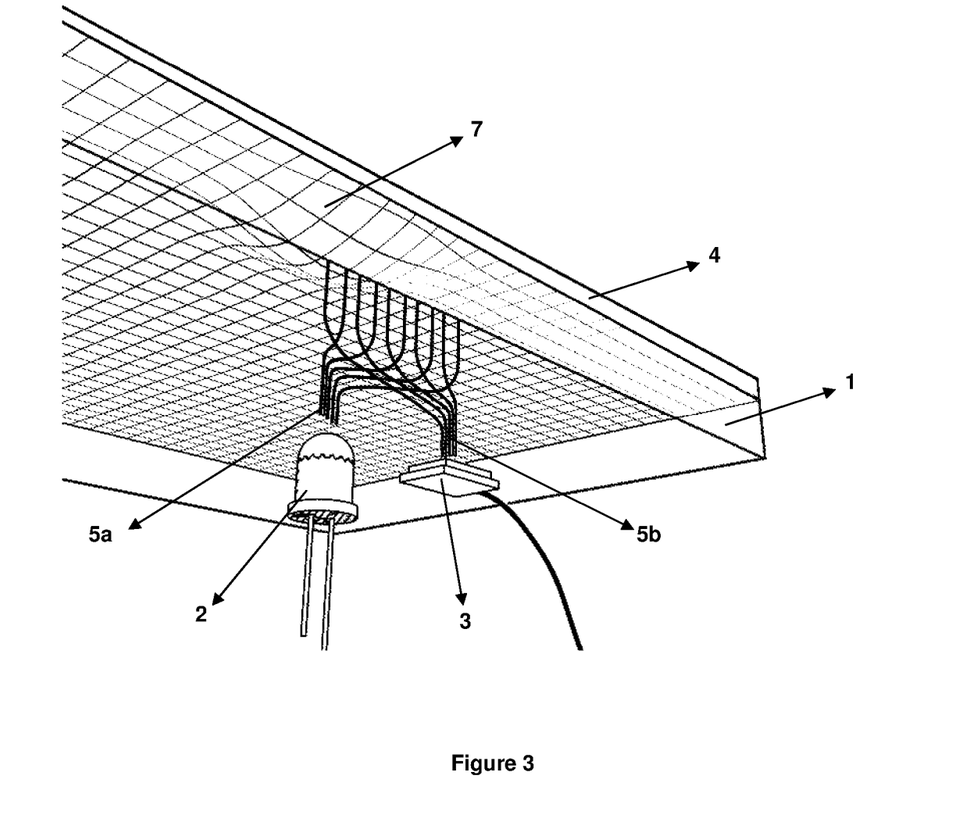
FIG. 3 is a perspective view of an exemplary embodiment of the sensing system as used.

In a preferred embodiment of the invention, said upper layer (4) comprises at least a pattern (7), as shown in FIGS. 2 and 3. The pattern (7) preferably having a squared, chess board shape deforms towards the intermediate layer (1), when exposed to a force, as shown in FIG. 3. An image frame of the upper layer (4) captured by the image sensor (3) is processed in the said control unit in order to determine in which area the pattern (7) has deformed and to what extent and how, and accordingly the force and pressure applied on the intermediate layer (1) is calculated.

In another preferred embodiment of the invention, said upper layer (4) comprises a material that changes color with force. In an illustrative embodiment, the upper layer (4) comprises a polarized film. If a force is applied on the polarized film, color changes are observed in the film based on the intensity of the force applied. Since the image frame of the upper layer (4) captured by the image sensor (3) is analyzed by the control unit using image processing techniques, the extent of color change in the polarized film is detected. As the said color change and area of color change is associated with the force applied on the upper layer (4), the extent of force and pressure applied through the upper layer (4) onto the intermediate layer (1) is also calculated.

In another preferred embodiment of the invention, the upper layer (4) comprises a piezochromic material. Piezochromic materials change color with pressure. Said color change varies depending on the pressure applied. In this embodiment, since the image frame of the upper layer (4) captured by the image sensor (3) is analyzed by the control unit using image processing techniques, color change in the piezochromic material, area of color change and thus the extent of the force and pressure applied through the upper layer (4) onto the intermediate layer (1) are calculated. Piezochromic materials may be reversible (which returns to its original color when the force applied thereon is removed) or irreversible (which does not return its original color when the force applied thereon is removed). In a preferred embodiment of the invention, the piezochromic material used in the sensing system (S) is reversible. Thus, when the force applied on the intermediate layer (1) is removed, piezochromic material returns to its original color and when a different force is applied on the intermediate layer (1), the newly-applied force is also detected. In an alternative embodiment, said upper layer (4) comprises a first layer positioned at its side close to the surrounding environment and preferably containing a reversible piezochromic material (or any one of other types of top surfaces), and a second layer positioned at its side distant to the surrounding environment and containing irreversible piezochromic material. In this embodiment, when a force is externally applied on the intermediate layer (1), a force and pressure is applied on the second layer as well. However, when a force higher than the envisaged force is applied on the intermediate layer (1), a force higher than the threshold value is imposed on the second layer and the color of the second layer permanently changes due to the irreversible piezochromic material thereof. Thus, it is detected whether a force higher than the envisaged force is applied on the intermediate layer (1) or not, as well as the magnitude of the force applied based on the color change of the second layer.

Figure 4:
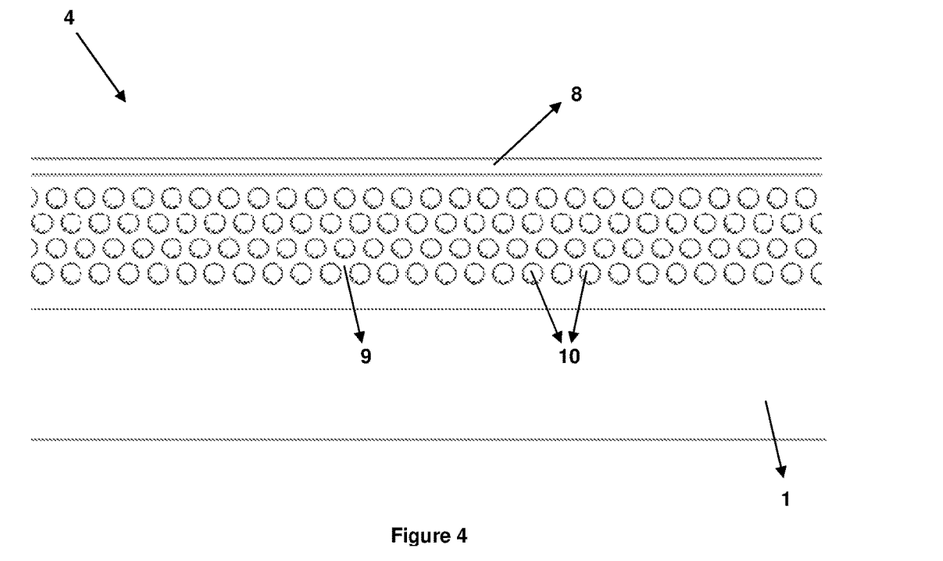
FIG. 4 is a side view of another exemplary embodiment of the sensing system.
Figure 5:
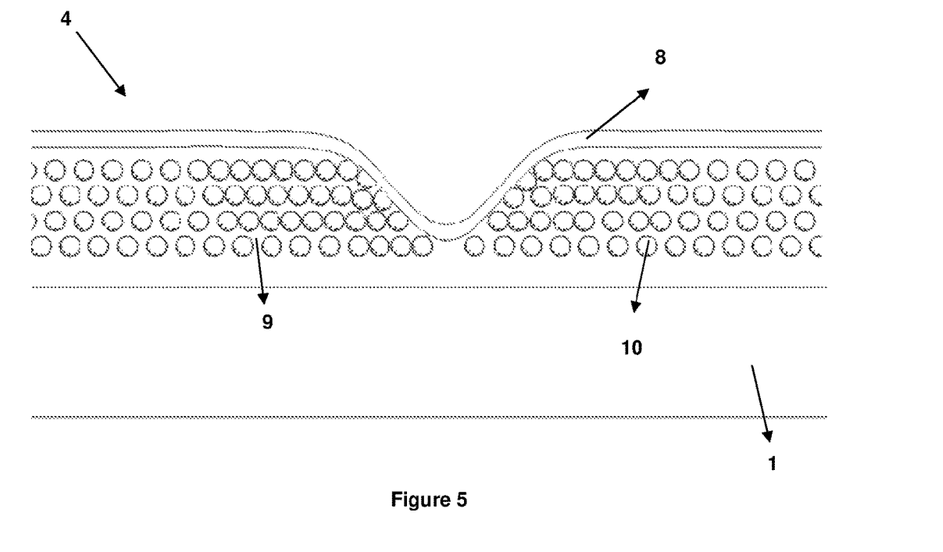
FIG. 5 is a side view of another exemplary embodiment of the sensing system as used.

In another preferred embodiment of the invention, the upper layer (4) comprises at least an outer layer (8) which is elastic and light-proof, at least an elastic element (9) positioned under the outer layer (8) and which is transparent and preferably in the form of a gel, and a plurality of (for example, at least in two rows) obstacles (10) positioned in the elastic element (9) and which are in the form of a light-proof particle such that its color is different from the outer layer (8), as shown in FIGS. 4 and 5. As shown in FIG. 5, when a force is applied through the upper layer (4) onto the intermediate layer (1), said outer layer (8) pushes the obstacles (10) to right and left sides and approaches to the intermediate layer (1). As a result of this movement, color changes are seen in the image frame of the upper layer (4) captured by the image sensor (3). By analyzing the said image frame by the control unit using image processing techniques, the extent of the color change is determined. Thus, the amount of force applied through the upper layer (4) onto the intermediate layer (1) is calculated.

In another preferred embodiment of the invention, the said upper layer (4) comprises a phosphor and/or any other material that stores a part of the light in itself but proceeds to emit light when the light coming from the light source is cut off. In this embodiment, the said light source (2) is activated at certain intervals in order to increase energy of the phosphor and/or similar material. Thus, even if the light source (2) is switched off, phosphor and/or similar material emits light for a certain period of time. In this embodiment, when a force is applied through the upper layer (4) onto the intermediate layer (1), the brightness of a section of the image frame of the upper layer (4) captured by the image sensor (3) which is subjected to force is higher than those sections which are not subjected to force. In the said image frame, brightness of different pixels is compared so that the force applied through the upper layer (4) on the intermediate layer (1) may be calculated.

In an alternative embodiment of the invention, said upper layer (4) partially transmits light (for example, a mirror film or a fine porous structure like a veil). As known, such structures normally transmit light but if an opaque object blocking transmission of light is placed behind same, it reflects light back. In this embodiment, light beams received from the light source (2), which are transmitted through the intermediate layer (1) onto the upper layer (4) via the first fiber optic bundle (5a), are normally transmitted to the surrounding environment (and an image of the surrounding environment is present in the image captured by the image sensor (3)). However, if an object is placed on the intermediate layer (1), light beams pass through the upper layer (4) and impinge onto the object and are reflected back from the object. An image of the said object is also present in the image frame captured by the image sensor (3). The image frame captured by the image sensor (3) is analyzed by the control unit using image processing techniques so that the force applied through the upper layer (4) onto the intermediate layer (1) may be calculated.

In another alternative embodiment of the invention, the first fiber optic bundle (5a), and/or the second fiber optic bundle (5b) are multi-piece bundles. In this embodiment, the first fiber optic bundle (5a) and/or the second fiber optic bundle (5b) comprises a first section including a plurality of fiber optic cables; a second section including a plurality of fiber optic cables; and a carrier fiber optic cable, to end of which is connected a tip of each fiber optic cables in the said first section and to another end of which is connected a tip of each fiber optic cable in the said second section, whose diameter is larger than that of the fiber optic cables in the first section and the second section, and which transmits the lights carried by the fiber optic cables in the first section to the fiber optic cables in the second section and the lights carried by the fiber optic cables in the second section to the fiber optic cables in the first section. In this way, in the embodiments wherein the length of the fiber optic cables must be long, it will be sufficient that one or a limited number of fiber optic cables (carrier fiber) is long, instead of a high number of fiber optic cables. In another embodiment of the carrier fiber, the diameter of the said carrier fiber optic cable is lower than that of the first section and the second section. In this embodiment, in order to have an exact pairing of each fiber optic cable in the first section with each fiber optic cable in the second section (i.e. to ensure that the light beams coming from different fiber optic cables do not intervene with each other), the first optic bundle (5a) and/or the second fiber optic bundle (5b) also comprise at least two optic elements, each interposed between the carrier fiber optic cable and the first section, and between the carrier fiber optic cable and the second section. The said optic elements prevent the light beams flowing through the carrier fiber optic cable from intervening with each other.

Figure 6:
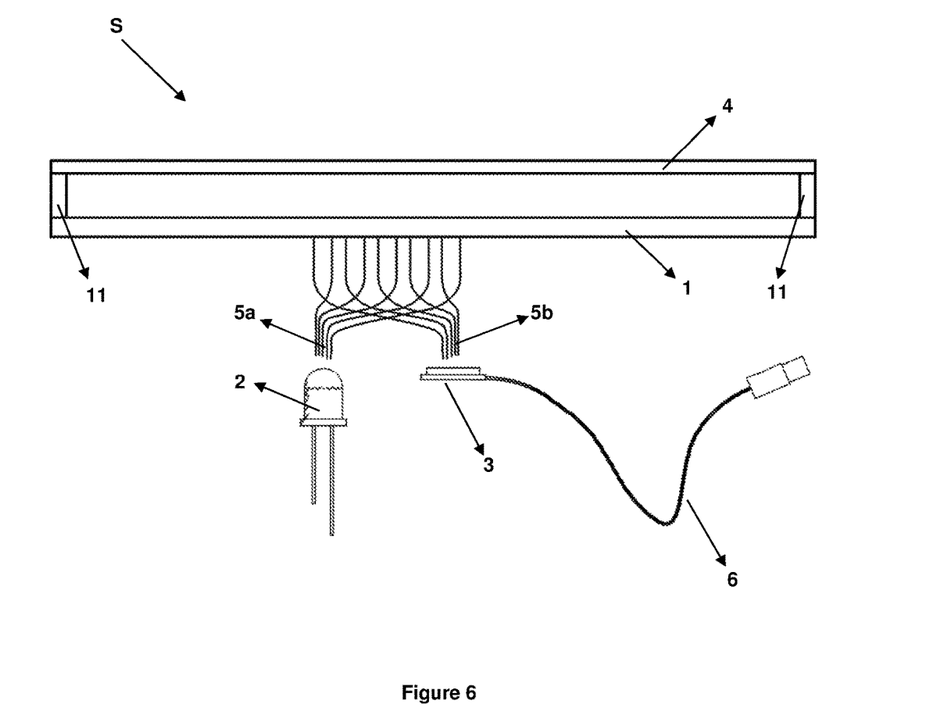
FIG. 6 is a side view of another exemplary embodiment of the sensing system.

In an alternative embodiment of the invention shown in FIG. 6, the sensing system comprises at least two distance elements (11), positioned between the said upper layer (4) and the intermediate layer (1), and which maintain the upper layer (4) and the intermediate layer (1) spaced from each other. In this embodiment, said upper layer (4) may either be elastic, or may be rigid.

In the sensing system (S) according to the present invention, light beams received from the light source (2) are passed through the intermediate layer (1) and onto the upper layer (4) via the first fiber optic bundle (5a). An image of the upper layer (4) is transmitted to the image sensor by means of the second fiber optic bundle (5b). Here, when a force is applied through the upper layer (4) onto the intermediate layer (1), an image frame of the form (and/or pattern (7)) change, color change or brightness change of the top surface (4) captured by the image sensor (3) is analyzed by the control unit using image processing techniques, so that the force applied through the upper layer (4) onto the intermediate layer (1) may be calculated. Furthermore, thanks to the displacement area represented by the area of color change in the image obtained, the pressure applied in any direction (for example, transversal angles) is calculated. Furthermore, with the detection of a change in a pattern (7) of the upper layer (4), the forces applied on the upper layer (4) from different angles (e.g. right angles) as well as their direction may also be detected.

The invention claimed is:

1. A sensing system (S) that detects touch, comprising:
   at least an intermediate layer (1);
   at least an upper layer (4) located on the intermediate layer (1);
   at least one light source (2) located under the intermediate layer (1);
   at least one image sensor (3) located under the intermediate layer (1);
   at least a first fiber optic bundle (5a) which comprises a plurality of fiber optic cables positioned such that a tips of which is facing to the light source (2) and other tips of which is facing to the said intermediate layer (1), and which transmits the light obtained from the light source (2) to the upper layer (4) located on the intermediate layer (1);
   at least a second fiber optic bundle (5b) which comprises a plurality of fiber optic cables, a tips of which is paired with at least one pixel of the image sensor (3) and other tips of which is positioned facing to the said intermediate layer (1), and which transmits the image of the upper layer (4) located on the intermediate layer (1) to the image sensor (3);
   at least one control unit which analyzes the image captured by the image sensor (3) using image processing techniques so as to calculate a force applied on the intermediate layer (1); and
   at least a data link (6) for data communication between the image sensor (3) and the control unit
   characterized in that the said upper layer (4) comprises a polarized film or a piezochromic material as a material that changes color with force.

2. A sensing system (S) according to claim 1, characterized in that the said upper layer (4) comprises at least one pattern (7).

3. A sensing system (S) according to claim 2, characterized in that the said pattern (7) is in the form of a chess board.

4. A sensing system (S) according to claim 1, characterized in that the said piezochromic material is reversible.

5. A sensing system (S) according to claim 1, characterized in that the said upper layer (4) comprises a first layer positioned at its side close to the surrounding environment and a second layer positioned at its side distant to the surrounding environment and containing an irreversible piezochromic material.

6. A sensing system (S) according to claim 5, characterized in that the said first layer comprises a reversible piezochromic material.

7. A sensing system (S) according to claim 1, characterized in that the upper layer (4) comprises at least an outer layer (8); at least an elastic element (9) positioned under the outer layer (8); and a plurality of obstacles (10) positioned in the elastic element (9) and which are in the form of a light-proof particle such that its color is different from the outer layer (8).

8. A sensing system (S) according to claim 7, characterized in that the said elastic element (9) is in the form of a gel.

9. A sensing system (S) that detects touch, comprising:
   at least an intermediate layer (1);
   at least an upper layer (4) located on the intermediate layer (1);
   at least one light source (2) located under the intermediate layer (1);
   at least one image sensor (3) located under the intermediate layer (1);
   at least a first fiber optic bundle (5a) which comprises a plurality of fiber optic cables positioned such that a tips of which is facing to the light source (2) and other tips of which is facing to the said intermediate layer (1), and which transmits the light obtained from the light source (2) to the upper layer (4) located on the intermediate layer (1);
   at least a second fiber optic bundle (5b) which comprises a plurality of fiber optic cables, a tips of which is paired with at least one pixel of the image sensor (3) and other tips of which is positioned facing to the said intermediate layer (1), and which transmits the image of the upper layer (4) located on the intermediate layer (1) to the image sensor (3);
   at least one control unit which analyzes the image captured by the image sensor (3) using image processing techniques so as to calculate a force applied on the intermediate layer (1); and
   at least a data link (6) for data communication between the image sensor (3) and the control unit
   characterized in that the said upper layer (4) comprises a phosphor and/or any other material that stores a part of the light in itself but proceeds to emit light when the light coming from the light source is cut off.

10. A sensing system (S) that detects touch, comprising:
    at least an intermediate layer (1);
    at least an upper layer (4) located on the intermediate layer (1);
    at least one light source (2) located under the intermediate layer (1);
    at least one image sensor (3) located under the intermediate layer (1);
    at least a first fiber optic bundle (5a) which comprises a plurality of fiber optic cables positioned such that a tips of which is facing to the light source (2) and other tips of which is facing to the said intermediate layer (1), and which transmits the light obtained from the light source (2) to the upper layer (4) located on the intermediate layer (1);
    at least a second fiber optic bundle (5b) which comprises a plurality of fiber optic cables, a tips of which is paired with at least one pixel of the image sensor (3) and other tips of which is positioned facing to the said intermediate layer (1), and which transmits the image of the upper layer (4) located on the intermediate layer (1) to the image sensor (3);
    at least one control unit which analyzes the image captured by the image sensor (3) using image processing techniques so as to calculate a force applied on the intermediate layer (1); and
    at least a data link (6) for data communication between the image sensor (3) and the control unit characterized in that the upper layer (4) partially transmits light.

\* \* \* \* \*